United States Patent
Viaud et al.

(12) 
(10) Patent No.: US 6,431,576 B1
(45) Date of Patent: Aug. 13, 2002

(54) SYSTEM FOR STEERING TOWED IMPLEMENT IN RESPONSE TO, OR INDEPENDENTLY OF, STEERING OF TOWING VEHICLE

(75) Inventors: Jean Viaud, Gray; Daniel Gunther, Mósbach, both of (FR); Herrmann Bestmann, Schmalfeld (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/553,363

(22) Filed: Apr. 20, 2000

(30) Foreign Application Priority Data

Apr. 28, 1999 (DE) .......................................... 199 19 321

(51) Int. Cl.[7] .............................................. B62D 13/00
(52) U.S. Cl. ....................................... 280/442; 280/419
(58) Field of Search ................................ 280/419, 426, 280/442–444, 656

(56) References Cited

U.S. PATENT DOCUMENTS

| 3,291,503 | A | | 12/1966 | De Lay | |
| 3,557,980 | A | * | 1/1971 | Klaus | ........................ 280/656 |
| 4,313,616 | A | * | 2/1982 | Howard | .................. 280/446 B |
| 4,468,047 | A | * | 8/1984 | McGhie et al. | ............. 280/419 |
| 4,572,315 | A | * | 2/1986 | Caron | ........................ 180/134 |
| 4,850,786 | A | * | 7/1989 | Oswald | ...................... 414/460 |
| 4,993,738 | A | * | 2/1991 | Bennett | ...................... 280/432 |
| 5,232,238 | A | * | 8/1993 | Ducote | ....................... 280/426 |
| 5,329,451 | A | * | 7/1994 | Notsu | .................... 364/424.05 |
| 5,364,116 | A | * | 11/1994 | Houle et al. | ................ 280/442 |
| 5,523,947 | A | * | 6/1996 | Breen | ..................... 364/424.05 |
| 5,579,228 | A | * | 11/1996 | Kimbrough et al. | ... 364/424.05 |
| 5,630,604 | A | * | 5/1997 | Ducote | ....................... 280/426 |
| 6,131,691 | A | * | 10/2000 | Morch | ........................ 180/418 |
| 6,152,475 | A | * | 11/2000 | Poole | ........................ 280/426 |

FOREIGN PATENT DOCUMENTS

| DE | 1 810 261 | 3/1970 |
| DE | 26 09 991 A1 | 10/1976 |
| DE | 29 48 181 C2 | 6/1981 |
| DE | 34 43 102 A1 | 5/1986 |
| DE | 37 20 273 C2 | 1/1989 |
| DE | 39 19 561 A1 | 12/1990 |
| DE | 40 12 699 C2 | 10/1991 |
| DE | 0 481 199 A2 | 4/1992 |
| DE | 44 14 161 C1 | 11/1995 |
| DE | 195 10 208 A1 | 9/1996 |
| DE | 196 35 462 A1 | 3/1998 |
| EP | 0 710 601 A1 | 5/1995 |
| WO | WO 87/1999 | 4/1987 |

* cited by examiner

Primary Examiner—Avraham Lerner
Assistant Examiner—L. Lum

(57) ABSTRACT

A steering system for a towed implement includes a first double-acting hydraulic actuator that is coupled between the towing vehicle and the towed implement such as that turning the towing vehicle relative to the towed implement results in fluid being forced out of the first actuator and into a second double-acting hydraulic actuator that is coupled for effecting steering of a steerable wheel of the towed implement. The piston rod of the second actuator is coupled to the piston rod of a third double-acting hydraulic actuator forming part of a control for steering the towed implement wheel independently of the turning action of the towing vehicle in order to straighten the steered wheel so that the implement may be moved backwards with out any problems. In one embodiment, the towed implement frame is made so as to be extensible and retractable in the fore-and-aft direction. The control when used with this implement aids in orienting the steered wheel, which is mounted to the movable section of the implement frame, so as to permit the movable section to move backwards either when the frame of the implement is being extended or when the entire implement frame is being moved backwards.

6 Claims, 3 Drawing Sheets

SYSTEM FOR STEERING TOWED IMPLEMENT IN RESPONSE TO, OR INDEPENDENTLY OF, STEERING OF TOWING VEHICLE

The present invention concerns steering a towed implement.

BACKGROUND OF THE INVENTION

It is known to steer a towed implement in response to turning the towing vehicle relative to a straight-ahead path.

DE-A1-39 19 561 shows a power steering arrangement for a trailer for agricultural and forest products utility vehicles. The steering is performed by a hydraulic cylinder combination including a first double-acting cylinder which is coupled between the towing vehicle and the tongue of the implement, so as to act as a turning sensor, and a second double-acting cylinder coupled for receiving fluid forced from the first cylinder during turning and transferring the resulting motion to a steerable wheel arrangement of the trailer so that the latter better tracks the turning movement of the towing vehicle. In this type of trailer power steering, it is difficult to back up the trailer without any problem.

EP-A1-0 710 601 shows a power steering arrangement for semi-trailer or trailer that includes a hydraulic cylinder combination including a first double-acting cylinder which is coupled so as to extend and retract in response to a turning operation of the towing vehicle with this movement of the first cylinder causing fluid to be coupled to a second double-acting cylinder which steers a set of wheels on the semi-trailer or trailer. The control arrangement is provided with a centering device through which the axle to which the wheels are attached can be brought and locked into a centered or straight-ahead position. For this purpose a pneumatic equalizing cylinder is used which is selectively coupled to a source of pneumatic pressure, the cylinder controlling a pair of toggle-shaped levers whose ends face away from the equalizing cylinder and serve to contact a plate carried by a steering rod so as to bring a hole in the plate into alignment with holes located in a pair of vertically spaced plates fixed to the wheel axle, alignment of the holes for receiving a locking pin occurring when the wheels are straight-ahead.

The problem underlying the invention is seen in the less than optimum performance and the complicated configuration of known steering systems for towed units.

SUMMARY OF THE INVENTION

According to the present invention there is provided an improved steering system for towed units, especially for towed implements of harvesting machines, for example.

An object of the invention is to provide a steering system for a towed implement which steers the wheels of the towed implement in accordance with the amount that the towing vehicle turns from a straight-ahead position, the system including a control by which the wheels of the trailing vehicle can be steered independently of the towing vehicle so that the towing vehicle may be operated in reverse.

A more specific object of the invention is to provide a steering system, as set forth in the previous object, wherein it is applied to a trailing vehicle that has an extensible rear section that is supported on steerable wheels, whereby the control is able to place the steerable wheels in a straight-ahead orientation relative to the trailing vehicle so that extension or retraction of the rear section of the towed implement may be done without difficulty.

These and other objects of the invention will be apparent from a reading of the ensuing description together with the appended drawings.

DESCRIPTION OF THE PREFERRED EMBODIMENT

Figure 1:
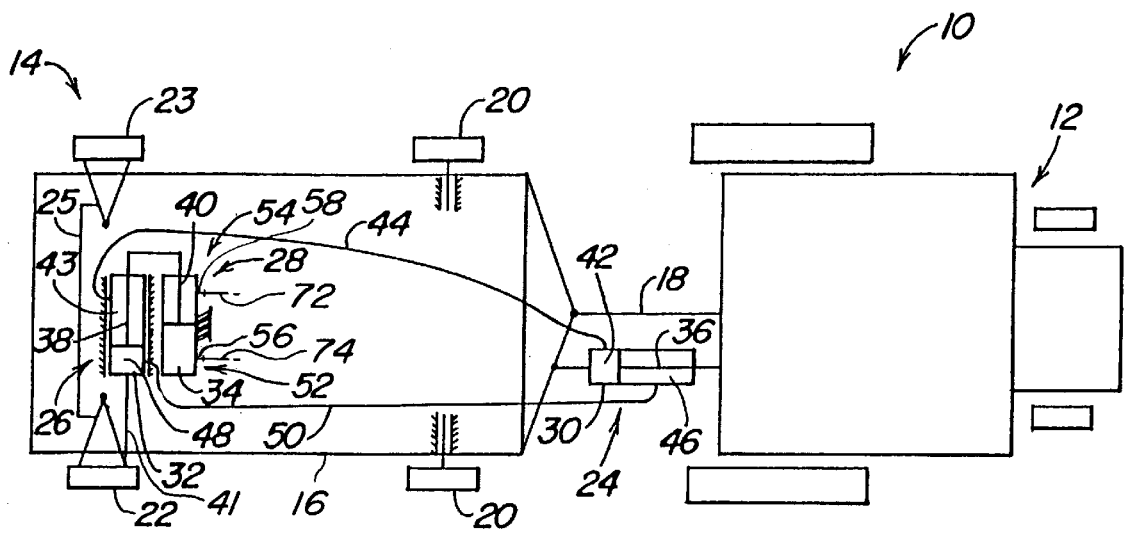
FIG. 1 is a schematic top view of a towing vehicle and a towed implement having a steering system constructed in accordance to the principles of the present invention for steering one set of wheels of the towed implement.

Referring now to FIG. 1, there is shown a train 10 comprising a towing vehicle 12, in the form of an agricultural utility vehicle such as, for example, an agricultural tractor, and a trailed implement 14.

The trailed implement 14 is provided with a frame 16, a coupling arrangement 18 configured as a draft tongue, two front wheels 20 mounted to the frame 16 for rotation about a horizontal transverse axle, not shown, and right- and left-hand rear wheels 22 and 23, each attached to the frame 16 through a suspension. The wheels 22 and 23 are each mounted for pivoting about a vertical axis and are coupled for turning together by a steering link 25. Beyond that, the vehicle train 10 is provided with a steering system for inputting a steering motion to the right-hand wheel 22.

The steering system includes a sensor 24, a positioning device 26 and a control device 28, each of which are configured as double-acting hydraulic motors and respectively having cylinders 30, 32 and 34 in which are respectively located piston and rod assemblies 36, 38 and 40.

The sensor 24 is arranged in parallel relationship to the coupling arrangement 18 and has its front and rear ends respectively pivotally coupled to the towing vehicle 12 and the trailing implement 14.

The positioning device 26 as well as the control device 28 are arranged on the frame 16 of the implement 14. The control device 28 has its cylinder 34 fixed to the frame 16 of the towed implement 14. The positioning device 26, on the other hand, has its cylinder 32 mounted on the frame 16 through a sliding guide, not shown, in such a way that the positioning device 26 can be slid in the direction of its longitudinal extent in parallel relationship to the cylinder 34 of the control device 28, when the position of the piston 38 in the cylinder 32 is fixed as is described in greater detail in the following.

The piston 40 of the control device 28 is rigidly connected to the piston 38 of the positioning device 26, so that the two pistons 38, 40 can only move in unison. The cylinder 32 of the positioning device 26 in turn engages the suspension of the wheel 22 over connecting elements, indicated schematically at 41.

A chamber 42 at the cylinder end of the sensor 24 is connected over a line 44 with a chamber 43 at the rod end of the positioning device 26. A chamber 46 at the rod end of the sensor 24 is connected over a line 50 to a chamber 48 at the piston end of the positioning device 26. The piston 40 of the control device 28 is effectively connected with the piston 38 of the positioning device 26. A chamber 52 at the piston end of the control device 28 and a chamber 54 at the rod end of the control device 28 are respectively provided with ports 56 and 58 for hydraulic control lines 72 and 74, that are coupled to an electromagnetic control valve 60, as shown in FIG. 5, for selectively being coupled with a hydraulic pressure source 61, shown only schematically, that may, for example, already be provided on the towing vehicle 12.

Figure 5:
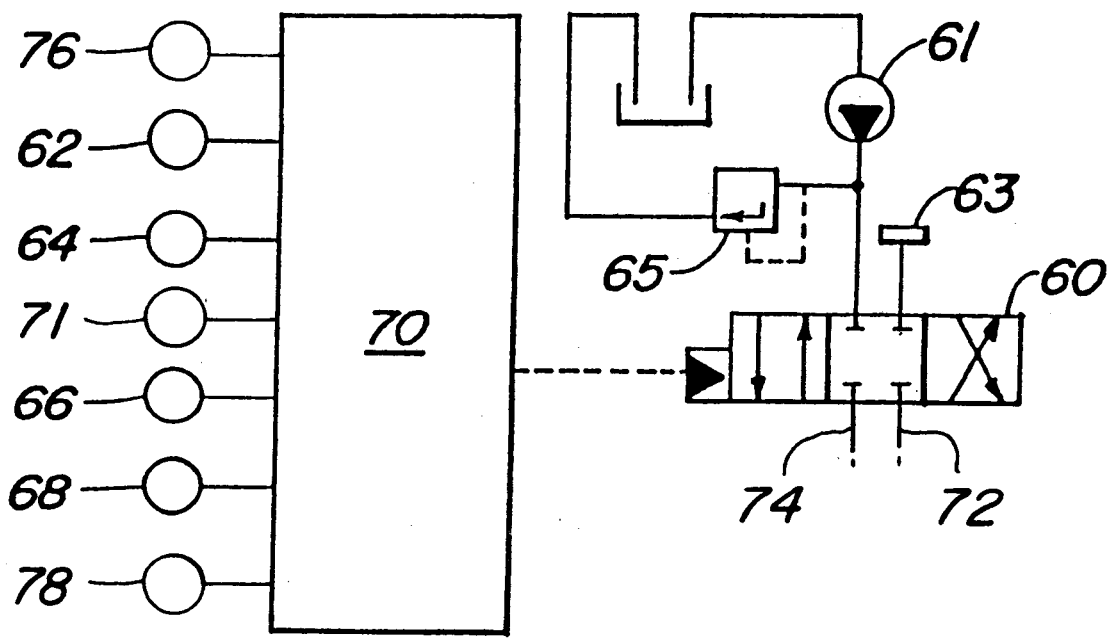
FIG. 5 shows a sketch of a circuit diagram for the steering system of the present invention.

As is shown in FIG. 5, the steering system includes three position sensors or wheel position sensors 62, 64, and 66 as well as a fourth position sensor or control device sensor 68. The wheel position sensors 62, 64 and 66 as well as the control device sensor 68 are connected with a control unit 70 that is preferably arranged on the towing vehicle 12 and that processes the values transmitted by the position sensors 62, 64, 66, and 68, and that determines the position of the electromagnetic valve 60 as a function of these transmitted values, the valve 60 being configured as a 3/2 way valve in the present embodiment. The connections 56 and 58 may be connected in fluid communication with the hydraulic pressure source 61 or with a fluid reservoir 63 over the control lines 72 and 74, by operation of the electromagnetic valve 60. Between the hydraulic pressure source 61 and the electromagnetic valve 60 a pressure relief valve 65 is provided. The first wheel position sensor 62 detects whether the wheel 22 is in the straight-ahead position. The second and third wheel position sensors 64 and 66, respectively, detect the immediate direction of deflection of the wheel 22. In place of the wheel position sensors 62, 64 and 66, a rotary potentiometer could also be provided to detect the position of the wheel 22. The control device sensor 68 detects whether the control device 28 is in its neutral position.

The method of operation of the steering system described is explained in the following. In normal operation, when the trailing implement 14 is coupled to the towing vehicle 12 and follows the direction of operation defined by the towing vehicle 12, the control unit 70 is not activated and no control pressure is applied over the electromagnetic valve 60 to the control device 28, which is preferably in its central, neutral position.

The steering system then operates in the same manner as a known power steering arrangement. The sensor 24 arranged between the towing vehicle 12 and the trailed implement 14 receives as input the steering angle that occurs between the steerable axle, not shown, of the towing vehicle 12 and the steerable axle, also not shown, of the trailed implement 14. As a function of this steering angle, the sensor 24 transmits an output value, that is, one of the lines 44 or 50 is supplied with pressure by the piston 36 as it slides in the cylinder 30, whereby one of the regions 44 or 46 of the positioning device 26 is supplied with pressure. Thereby the position of the cylinder 32 of the positioning device 26 is changed with respect to its piston 38, and the wheel 22, which is connected to the cylinder 32 of the positioning device 26, is steered accordingly. The control device 28 is preferably in its central, neutral position and retains the piston 38 of the position device 26 in a fixed position with respect to the towed vehicle 14 through the connection of the pistons 38 and 40.

If the wheel 22 is now to be brought into a straight-ahead position, for example, when the towing vehicle is to be operated in reverse, then the control unit 70 is activated. This can be performed, for example, by manualy producing a control signal through an actuating arrangement 76 provided on the towing vehicle or automatically as a function of the operating condition, for example, from a sensor 78 which senses the selected direction of operation of the towing vehicle 12. The immediate position of the wheel 22 is detected through the output values of the wheel position sensors 62, 64 and 66, and the position of the control device 28 is detected through the control device sensor 68 having an output connected to the control unit 70. One of the connections 56 or 58 of the control device 28 is connected to the source of pressure fluid 61 through operation of the electromagnetic valve 60 as controlled by the control unit 70, as a function of the detected steering angle of the wheel 22. Thereby, the piston 40 of the control device 28 is moved in the cylinder 34 that is rigidly attached to the frame 16 of the towed vehicle 14. The piston rod 40 is rigidly connected to the piston rod 38 of the control device 28. Since the piston 38 of the positioning device 26 is retained in a predetermined position by the pressure relationships applied through the sensor 24 upon the positioning device 26, the positioning device 26 is shifted as a whole along its guide, not shown, by movement of the piston 40 of the control device 28. The process is ended by the control unit 70 when the first wheel position sensor 62 detects the fact that the wheel 22 is in the straight-ahead position.

Figure 2:
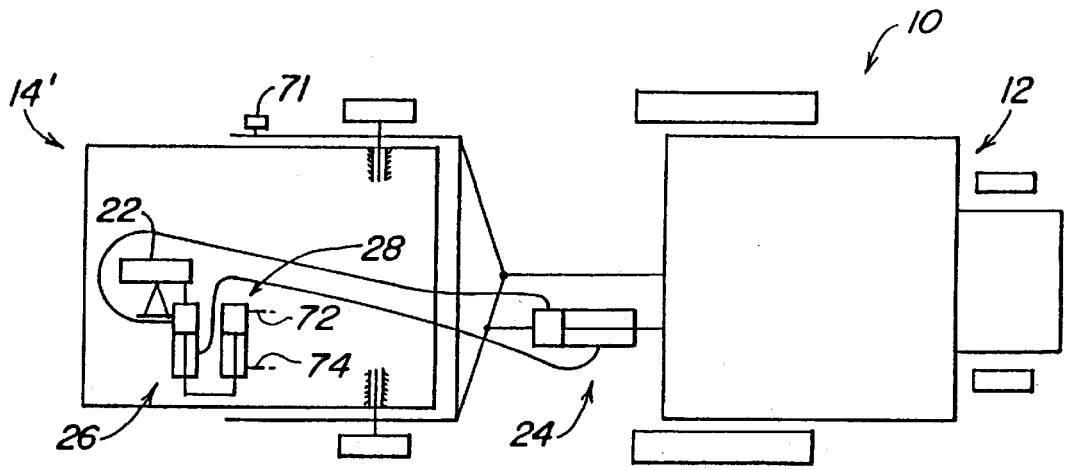
FIG. 2 is a schematic top view like FIG. 1 but showing a second embodiment of a towed implement which is variable in length, the implement being shown in its retracted position.
Figure 3:
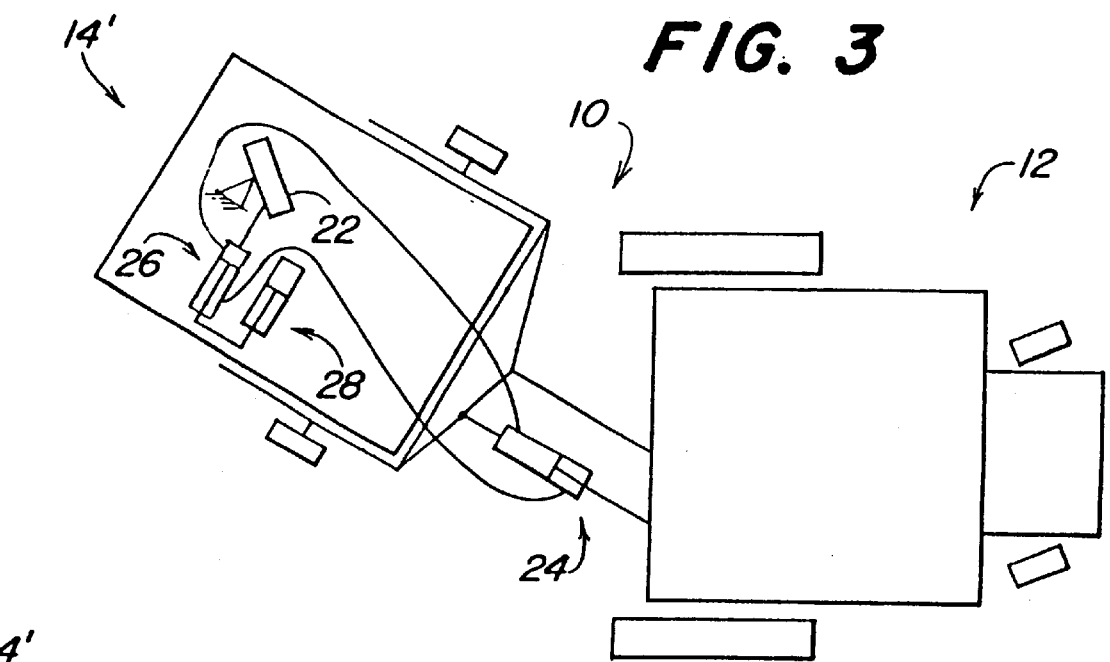
FIG. 3 shows the towed implement of FIG. 2 during a turn before the start of the extension of the implement.
Figure 4:
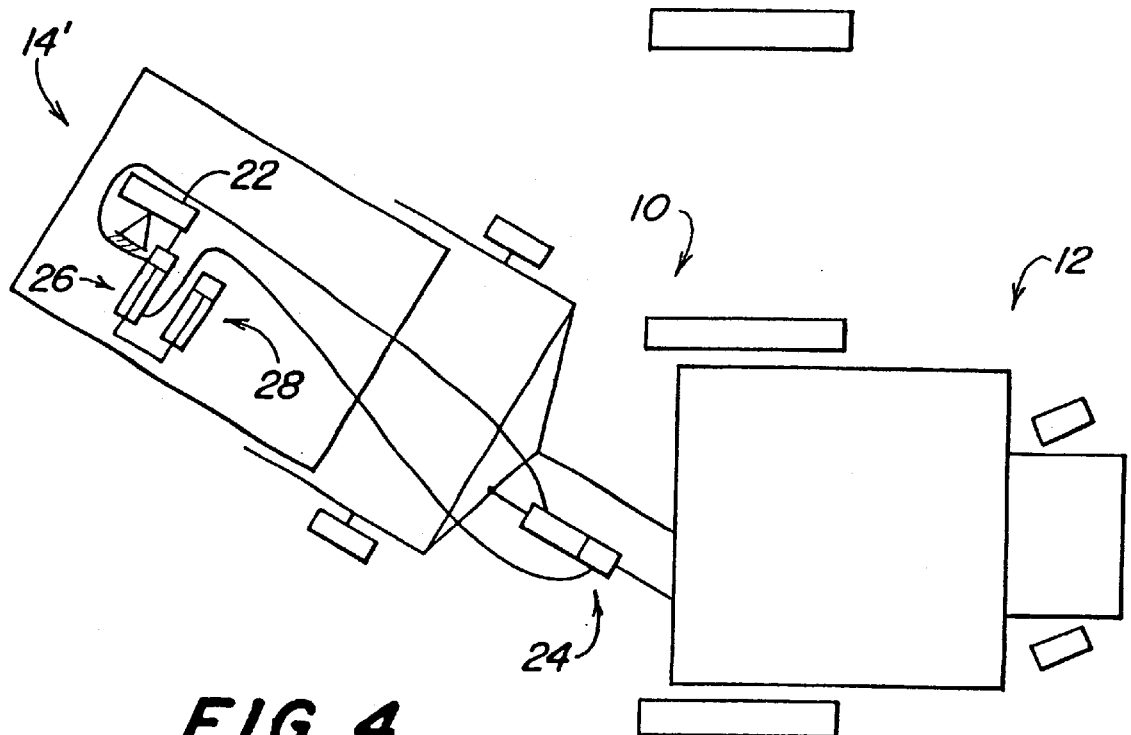
FIG. 4 shows the towed implement of FIG. 3 after the end of the extension operation.

In FIGS. 2 through 4, an alternative embodiment with a differently configured trailed vehicle 14' is shown. The identification and numbering of various components, which are like those described above with reference to the embodiment disclosed in FIG. 1, is retained. The main difference between the embodiments is that the trailed implement 14' is configured so as to be variable in length. Here this can be, for example, applied to a bale wrapping implement trailed behind a baler. If the assembled length of the trailed implement 14' is to be varied when following the towing vehicle is pulling the implement 14' along a curved path, that is when a steering angle is developed between the steerable axles of the towing vehicle 12 and of the towed implement 14' and the wheel 22 is deflected, then the control unit 70 is activated manually or automatically, for example, as a function of the operating condition of the trailed implement 14', in order to bring the wheel 22 into a straight-ahead position, so as to reduce loads on wheels and other components of the trailed implement 14'. This is clarified in FIGS. 3 and 4. FIG. 3 shows the train 10 in a position that it assumes during operation around a curve. Due to the interaction of the sensor 24 and the positioning device 26, the wheel 22 is in such a deflected position that it follows the operation around the curve 25 of the towing vehicle 12. The control device 28 is in its neutral position and has no effect upon the steering performance.

If the length of the trailed implement 14' is to be varied, when the train 10 is in a position to operate around a curve, then the control unit 70 controls the electromagnetic valve 60 in such a way that either the connection 56 or the connection 58 is supplied with pressure from the hydraulic pressure source 61. Thereby, the piston 40 of the control device 28 slides in its cylinder 34, whereby the positioning device 26 slides as a whole along its guide, not shown. When the wheel position sensor 62 detects that the wheel 22 is in its neutral position, it transmits a signal to the control unit 70, which thereupon brings the electromagnetic valve 60 into its neutral blocking position in which the connections 56 and 58 are connected neither with the hydraulic pressure source 61 nor with the reservoir 63.

Before the repositioning of the wheel 22, the control unit 70 can receive, in addition to the output values of the wheel position sensors 62, 64 and 66, the output value of the control device sensor 68, which reproduces the position of the piston 40 of the control device 28, and stores this value in memory. After the completion of the variations in length and the return of the trailed implement 14' into the starting position, the control unit 70 supplies pressure to the control device 28 for such a time until the control device sensor 68 again transmits a corresponding output value and the piston 40 returns again to the same position as before the change in length. It is also conceivable that the output value is processed by the control unit 70 in such a way that, after a change in the length of the trailed implement 14', it supplies pressure to the control device 28 over the electromagnetic valve 60 in such a way that the position of the wheel 22 corresponds to the actual relative position of the train 10. The extension position of the towed implement 14' can be detected, for example, by an additional extension sensor 71 that is arranged on the towed implement 14'. The data detected by the extension sensor 71 can also be processed by the control unit 70 upon a change in length of the towed implement 14' as a function of the position of the wheel 22 and of the extension sensor 71. After the completion of the process, the steering angle of the wheel 22 is then again the result of the power steering through the sensor 24 operating on the positioning device 26 and thereby on the wheel 22. This return to the original position of the control device 28 and thereby the wheel 22 can be applied in the first as well as in the second embodiment.

What is claimed is:

1. In a steering system for a towed implement coupled to a towing unit wherein the steering system includes at least a first extensible and retractable hydraulic actuator coupled between the towed vehicle and towing unit so as to generate a hydraulic fluid output having a value which is a function of at least the relative position of the towed vehicle to the towed unit, a positioning device including at least a second extensible and retractable hydraulic actuator connected to a steerable wheel of said towed implement and coupled for receiving said hydraulic fluid output of said first extensible and retractable hydraulic actuator so as to be controlled in response to said hydraulic fluid output to reposition said steerable wheel an amount which is a direct function of the value of said hydraulic fluid output, and a control device coupled for effecting positioning of said steerable wheel independently of said first extensible and retractable hydraulic actuator, the improvement comprising: said second extensible and retractable hydraulic actuator having a longitudinal axis and being mounted to said towed implement for being shifted as a unit along said longitudinal axis; and said control device being mechanically coupled to said second extensible and retractable hydraulic actuator and selectively operable for shifting said second extensible and hydraulic actuator as a unit along said longitudinal axis for effecting movement of said steerable wheel independently of said first extensible and retractable actuator.

2. The steering system, as defined in claim 1, wherein said first and second extensible and retractable hydraulic actuators are each double-acting hydraulic motors, with said first extensible and retractable hydraulic actuator having first and second chambers at opposite sides of a first piston and with said second extensible and retractable hydraulic actuator including third and fourth chambers at opposite sides of a second piston respectively coupled in fluid communication with said first and second fluid chambers.

3. The steering system, as defined in claim 1, wherein said control device includes a double-acting hydraulic motor having one of a cylinder and piston rod fixed to said towed implement and another of said cylinder and piston rod fixed to said second extensible and retractable hydraulic actuator.

4. The steering system, as defined in claim 1, and further including a control unit for controlling operation of said control device; an actuating arrangement coupled to said control unit for selectively actuating said control unit; at least one wheel position sensor for determining whether said steerable wheel is straight ahead or turned one way or the other and generating a wheel position signal; said control unit including a signal processor coupled for receiving said wheel position signal; and said signal processor acting, when said control unit is actuated through operation of said actuating arrangement, for effecting operation of said control device for returning said wheel to said straight ahead position if it is in other than said straight ahead position.

5. The steering system, as defined in claim 4, wherein said control device is a double-acting hydraulic cylinder; said steering system further including a source of fluid pressure, a sump and an electromagnetic valve having supply and return ports respectively coupled to said source and sump and having a pair of pressure/return ports respectively coupled to said control device; said signal processor having an output coupled to said electromagnetic valve; and said electromagnetic valve being operable in response to an output signal generated by said signal processor, in response to signals received from said actuating arrangement and said at least one wheel position sensor, to return said steerable wheel to its straight ahead position if it is in other than said straight ahead position.

6. The steering system, as defined in claim 4, wherein said implement includes front and rear sections coupled together so as to permit the rear section to selectively extend rearwardly relative to said front section; said steerable wheel being attached to said rear section; and said actuating arrangement including a condition sensor for actuating said control unit in response to said rear section being operated to extend rearwardly relative to said front section.

\* \* \* \* \*